United States Patent [19]
Leitch et al.

[11] Patent Number: 5,761,614
[45] Date of Patent: Jun. 2, 1998

[54] AUTOMATED SYSTEM AND METHOD FOR OPTIMIZING RECEIVE SYSTEM PERFORMANCE

[75] Inventors: Neil G. Leitch; Jerome M. Daniszewski, both of Lynchburg, Va.

[73] Assignee: Ericsson Inc., Research Triangle Park, N.C.

[21] Appl. No.: 620,262

[22] Filed: Mar. 22, 1996

[51] Int. Cl.[6] ............................................... H04B 1/10
[52] U.S. Cl. .......................... 455/254; 455/67.3; 455/295; 455/226.1
[58] Field of Search ..................... 455/67.1, 67.3, 455/132, 136, 226.1, 235.1, 245.1, 245.2, 246.1, 249.1, 250.1, 253.2, 254, 296, 303, 304, 305, 295, 234.1, 234.2, 311, 561, 562, 557; 375/345, 349, 351, 346

[56] References Cited

U.S. PATENT DOCUMENTS

| | | |
|---|---|---|
| 4,355,414 | 10/1982 | Inoue . |
| 4,654,884 | 3/1987 | Sakai et al. ........................ 455/295 |
| 5,144,642 | 9/1992 | Weinberg et al. ................. 455/226.1 |
| 5,170,392 | 12/1992 | Riordan ............................. 455/295 |
| 5,307,379 | 4/1994 | Bergstrom et al. . |
| 5,323,422 | 6/1994 | Ushirokawa . |
| 5,347,222 | 9/1994 | Fox et al. . |
| 5,359,607 | 10/1994 | Nguyen et al. . |
| 5,361,404 | 11/1994 | Dent . |
| 5,396,657 | 3/1995 | Jokinen . |
| 5,410,750 | 4/1995 | Cantwell et al. . |
| 5,590,156 | 12/1996 | Carney ............................... 375/349 |
| 5,630,223 | 5/1997 | Bahu et al. ........................ 455/304 |

FOREIGN PATENT DOCUMENTS 2223146  3/1990  United Kingdom ............... 455/254

Primary Examiner—Reinhard J. Eisenzopf
Assistant Examiner—Lester G. Kincaid
Attorney, Agent, or Firm—Nixon & Vanderhye P.C.

[57] ABSTRACT

The performance of a radio receive system such as a trunked or non-trunked land mobile multi-channel receiver site is optimized to maximize coverage area and receiver dynamic range while minimizing the potential for intermodulation distortion. A noise test receiver including a noise receiver and a spectrum analyzer measures ambient noise and strong ambient signals. A computer analyzes the resulting spectral information to determine likely intermodulation distortion products and associated amplitudes. The computer compares the measured noise and intermodulation product results with system characteristics to arrive at an optimum variable attenuator setting that maximizes receiver sensitivity and dynamic range while protecting against intermodulation distortion. In one example, the optimized performance parameters are computed dynamically and used to dynamically control the value of a programmable attenuator, thus yielding maximum system performance under varying conditions.

20 Claims, 4 Drawing Sheets

*Overall Receiver System*

Overall Receiver System

5,761,614

AUTOMATED SYSTEM AND METHOD FOR OPTIMIZING RECEIVE SYSTEM PERFORMANCE

FIELD OF THE INVENTION

The present invention relates to radio receiving systems, and more particularly to techniques for optimizing the performance of a radio receive system.

BACKGROUND AND SUMMARY OF THE INVENTION

Multi-user radio communication systems commonly employ multiple receivers connected to a common antenna. The antenna may be located at high elevation such as at the top of a radio tower. A feed line such as coaxial cable commonly connects the antenna to multiple radio receivers installed at the tower's base. In typical cellular and land-mobile radio systems, each receiver is set to receive on a different frequency-allowing multiple radio conversations to be carried on simultaneously.

System designers typically want the receivers to be highly sensitive because increased sensitivity provides greater coverage area. A more sensitive receiver can more reliably receive signals transmitted by a transmitter on the fringe of its coverage area. Tower-top amplifiers (TTAs) have been used for many years to increase the effective receive sensitivity of radio receivers. The tower top amplifier is typically mounted on the radio tower close to the antenna. It amplifies the antenna signal before sending it down the feed line to the receivers—thereby overcoming losses introduced by the feed line. In a multi-receiver system, a multi-coupler is frequently connected at the other end of the feed line to split the required signals off to the multiple receivers. In addition, a filter may be installed before the multi-coupler to reject strong out-of-band signals.

While tower top amplifiers and multi-couplers provide increased capabilities, they can sometimes degrade effective system performance because the characteristics of the received site and the recipient receiving equipment are not applied to the system design.

One problem that commonly arises in receiver systems relates to a phenomenon called "intermodulation distortion." As the radio spectrum has become more crowded, there are more and more radio transmitters operating within each radio system and on nearby frequencies. Receivers need to optimally resolve the different radio signals—receiving desired signals as clearly as possible while rejecting all other signals. Intermodulation distortion effects can frustrate these efforts.

FIG. 1 shows a simplified example of how intermodulation distortion effects can cause problems. In FIG. 1, a radio receiver system is shown including a common antenna 10 mounted atop a radio tower 12. In this example, a police car 14 that is physically close to radio tower 12 transmits on radio frequency F1, a police officer 16 also physically close to the radio tower transmits on radio frequency F2, and a more distant police car 18 transmits on still another radio frequency F3. In this example, signals F1, F2 at radio antenna 10 are sufficiently strong that they cause intermodulation distortion within the various radio receivers 20 connected to antenna 10. Because of internal limiters, receivers 20(1) and 20(2) can still reliably receive the strong signal at frequencies F1, F2 respectively. However, the frequencies F1 and F2 can mix together within the "front end" of a radio receiver (or within other non-linear circuits outside of the radio receiver) to generate intermodulation distortion products. For example, the so-called third-order intermodulation distortion products will appear at frequencies of (2F1–F2) and (2F2–F1). In a multi-receiver system, one or both of these intermodulation distortion products can easily fall at or near the frequencies received by other receivers and can cause problems because of the high gain, wide band width front ends of the receivers. For example, frequency F3 may be received by another receiver 20—and the intermodulation distortion product or frequency F3 may interfere with reception of signals transmitted by police car 18. Hence, intermodulation distortion products have the potential of degrading system reliability.

The problems of intermodulation distortion can be minimized or eliminated by reducing the strength of strong signals at the receive site. For example, many cellular systems include a capability that allows a cellular radio site to transmit a message to the cellular radio telephone that controls the transmitter to "turn down" its power output. The cellular site can transmit this message when the radio telephone is in very close proximity to the radio site—thus reducing the possibility of intermodulation distortion effects. Unfortunately, most land-mobile radio systems do not have this capability. Moreover, land-mobile radio sites on average typically have much larger coverage areas than cellular radio sites—requiring land-mobile radio transmitters to be much more powerful (e.g., providing RF power outputs of 3 watts or more for portable transceivers and 25 to 100 watts for mobile radio transceivers, as compared to RF power outputs of less than a watt for most cellular radio telephones). Higher output power increases the potential for harmful third or even fifth order intermodulation distortion products to be generated at the receive site.

The present invention solves these problems by providing a technique to optimize receive system performance based on the particular characteristics of the site and the recipient receiving equipment.

In accordance with one aspect provided by the present invention, a noise test receiver is used to measure the ambient radio noise and the strength and frequencies of signals at the receiver site. The noise test receiver may be coupled directly to the antenna through a coupler—thus bypassing the downstream receive site equipment and allowing the noise test equipment to analyze the "raw" received signal. A computer coupled to the output of the noise test receiver can model the characteristics of the receiver equipment based on system data containing configuration information. The computer analyzes the data provided by the noise test receiver, and computes an attenuation value that provides optimum receive system sensitivity and dynamic range without degrading the intermodulation performance. The computer's output may be used to adjust a programmable attenuator to the computed value.

In accordance with another aspect provided by the present invention, the noise test receiver measures ambient noise across the operating frequencies of the receive system, and also measures the frequency and amplitude of each strong signal within the system's operating frequency spectrum. The computer uses this information to optimize the programmable attenuator setting. For example, the computer may use the spectral analysis of strong signals outputted by the noise test receiver to calculate likely troublesome intermodulation distortion products. The computer may compare these intermodulation distortion products to the system's frequency/channel plan to determine which products, if any, may cause trouble. The computer may further compare potentially troublesome intermodulation distortion product amplitudes and frequencies with predetermined system data describing receiver intermodulation rejection. Additionally, the computer may use the site "noise floor" information produced by the noise test receiver to optimize the receive dynamic range of the system. A computer may optimize the variable attenuation factor based on this comparison to maximize receiver sensitivity while minimizing the potential for harmful intermodulation distortion.

In accordance with another aspect provided by the present invention, each receive system is uniquely optimized for sensitivity in intermodulation performance (and consequently the receive system coverage) by:

measuring the ambience site noise characteristics;

detecting the presence and signal strength of potential distortion generating signals; and accessing system configuration data including receiver sensitivity, receiver intermodulation rejection, coaxial feedline losses, multi-coupler gain and noise figure, tower top amplifier gain and noise figure, system channel plan, and filter loss.

Additionally, the system's filter characteristics may be modeled for optimum performance and a unique customized filter model can be applied to each receive site.

In accordance with yet another aspect provided by the present invention, the optimized performance parameters may be computed dynamically, and may be used to dynamically control the value of a programmable attenuator to yield maximum system performance under varying conditions.

BRIEF DESCRIPTION OF THE DRAWINGS

These and other features and advantages provided by the present invention will be better and more clearly understood by referring to the following detailed description of example embodiments in conjunction with the drawings, of which.

DETAILED DESCRIPTION OF AN EXAMPLE EMBODIMENT

Figure 1:
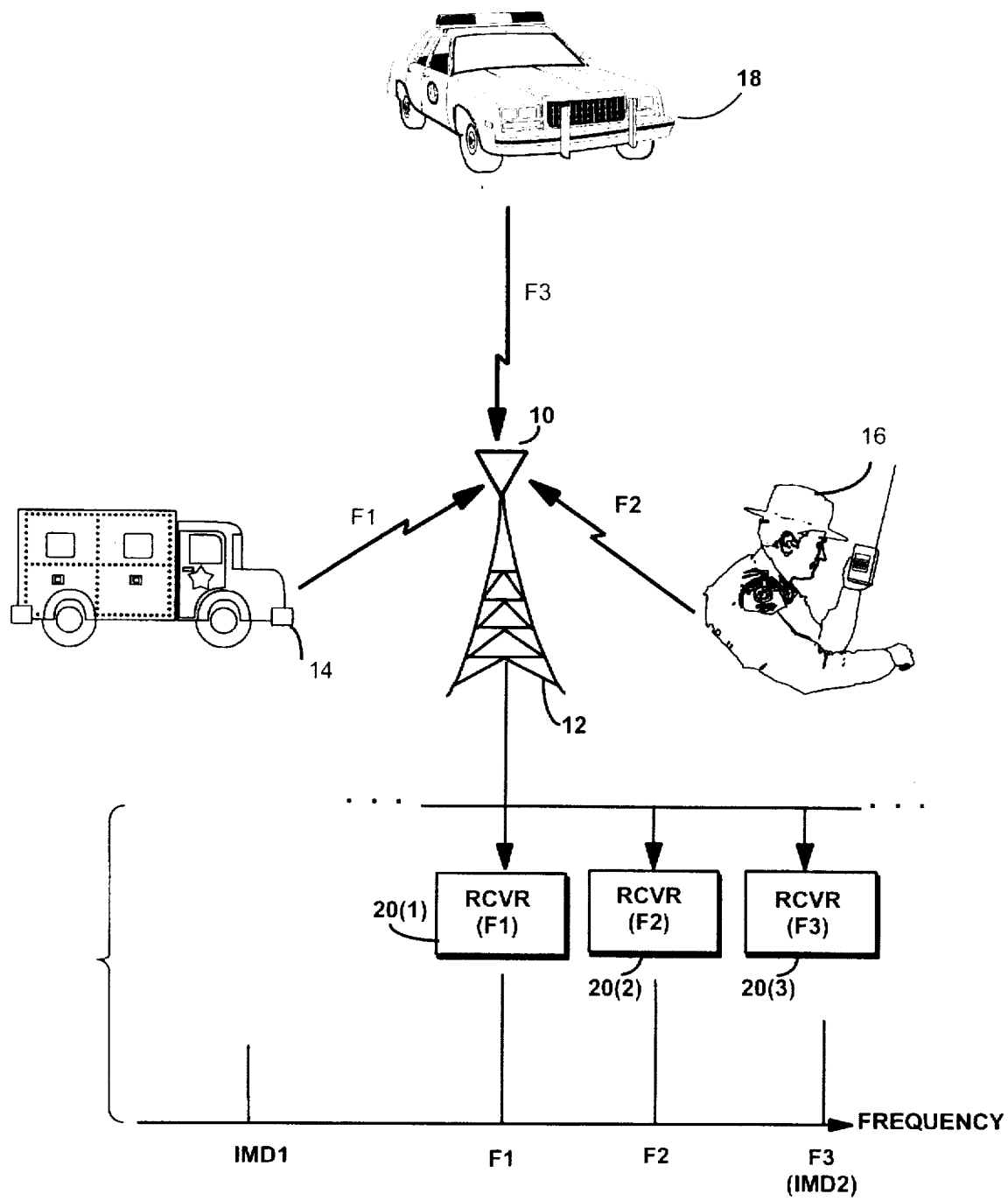
FIG. 1 shows a simplified example receive site showing how intermodulation distortion can cause problems.
Figure 2:
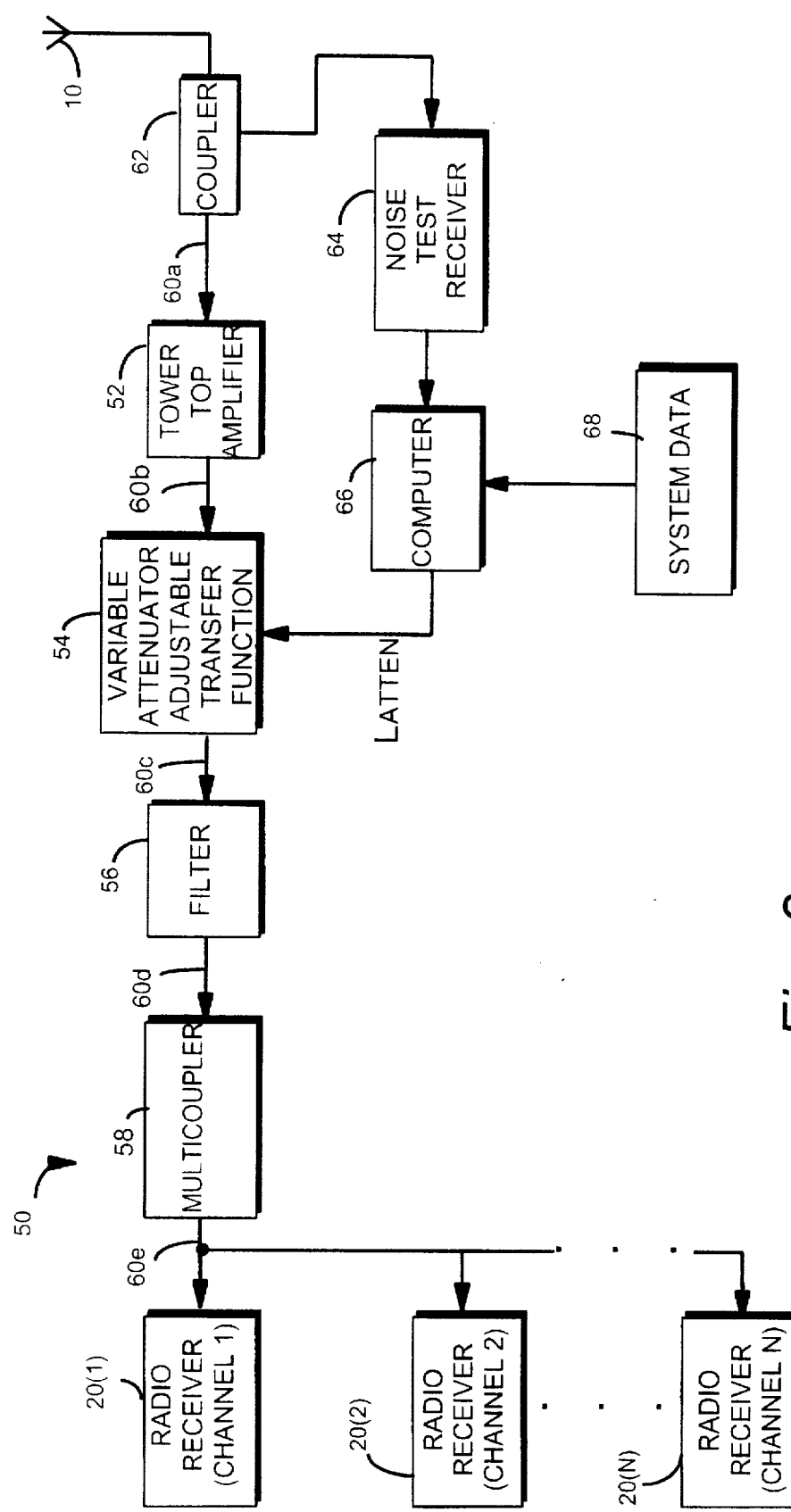
FIG. 2 is an example overall receive system provided in accordance with the present invention.

FIG. 2 is a block diagram of an example overall receiver system 50 provided in accordance with this invention. System 50 includes multiple radio receivers 20 each operating on a different radio frequency. For example, radio receiver 20(1) may receive radio signals at a radio frequency F1, radio receiver 20(2) may receive radio signals at a radio frequency F2, and so on. In a typical land-mobile radio system, there may be 12, 24 or more radio receivers 20 each operating at a different radio frequency.

Radio receivers 20 are coupled to a common receiving antenna 10 through equipment including a tower top amplifier (TTA) 52, a variable programmable attenuator 54, a bandpass filter 56, a multi-coupler 58, and coaxial feedline 60 (which is also used to connect some or all of the abovementioned equipment together).

The tower top amplifier 52 (which is typically mounted at the top of the radio tower 12 as close to antenna 10 as possible) provides an amplification (gain) for overcoming losses in the feedline 60 that carries the received signal to receiver 20 at the bottom of the tower. Tower top amplifier 52 applies a gain to the signals received by antenna 10, but also inherently introduces noise into the received signal. The amount of gain and the amount of noise introduced by tower top amplifier 52 may be determined by examining the manufacturer's specification with respect to gain and noise figure.

Filter 56 is used to reject out-of-band signals received by antenna 10 to prevent them from generating intermodulation distortion products within multi-coupler 58 and/or radio receivers 20. Filter 56 is typically a passive filter, and therefore introduces a loss which can be measured by testing the filter in a laboratory. Additionally, the frequency selected characteristics of filter 56 can be ascertained through laboratory testing. Filter 56 may be customized to the particular channel plan of system 50, i.e., it takes into account the operating frequencies of each of radio receivers 20 so that it does not reject any desired signals but rejects as many undesired signals as possible.

Multi-coupler 58 acts to split the received, filtered signal into multiple independent feeds for application to the different radio receivers 20. Multi-coupler 58, being an active device including amplifiers, introduces a gain and noise. The amount of gain and noise introduced by multi-coupler 58 can be determined through laboratory testing and/or by examining the manufacturer's specifications.

Radio receivers 20 each have various characteristics, the important ones here being operating frequency, sensitivity and receiver intermodulation rejection. These parameters are easily and/or otherwise determined. Finally, the loss introduced by feedline 60 may also be measured and/or calculated.

The example shown in FIG. 2 includes additional components used to optimize the performance of system 50 based on a combination of the fixed characteristics discussed above and on measured ambient signal conditions. In this example, the output of antenna 10 is passed through a lowloss high quality coupler 62 which couples some of the received energy to a noise test receiver 64. Noise test receiver 64 (which may be two receivers, i.e. a receiver similar to receiver 20 and a spectrum analyzer receiver) analyzes the noise and signal components within the "raw" signal received by antenna 10, and provides its measurements to computer 66. Computer 66 has access to stored system data 68 described the various fixed system characteristics set forth above. Computer 66 performs an analysis and comparison based on the noise and signals measured by noise test receiver 64 and further based on system data 68. It generates a responsive optimal attenuation value $L_{atten}$, and applies this optimal attenuation value to set the attenuation of variable attenuator 54 to provide optimum receive system sensitivity without degrading intermodulation performance.

In this example, noise test receiver 64 comprises a conventional programmable radio receiver that mimics the characteristics of radio receivers 20. Noise test receiver 64 additionally includes a spectrum analyzer capable of measuring the frequency and amplitude of each significant radio signal found across a given band of interest. Noise test receiver 64 in this example produces spectral noise and signal outputs in digital form for analysis by computer 66.

Figure 3:
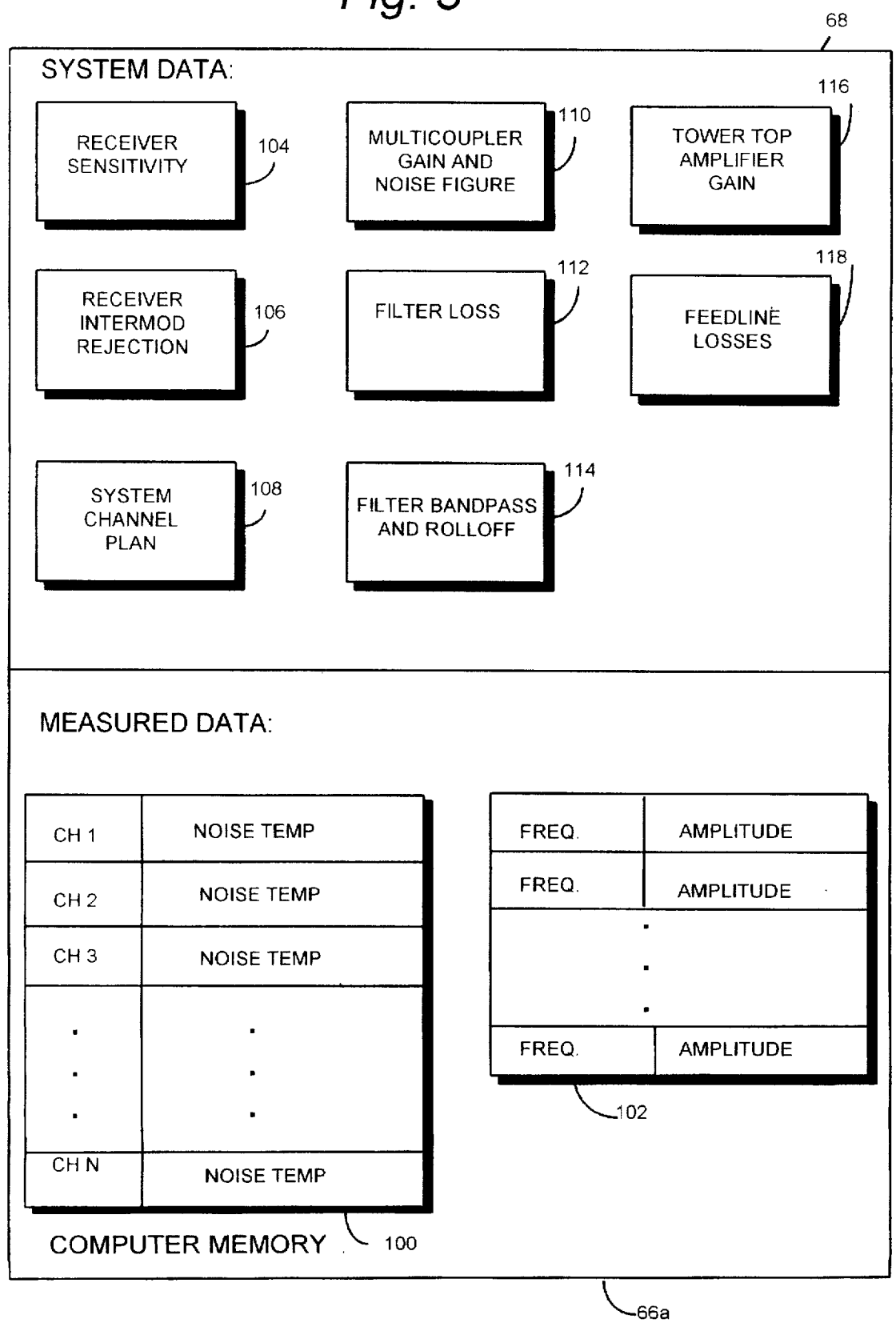
FIG. 3 shows example data structures including system data and measured data.

FIG. 3 shows, at its bottom portion, example noise test receiver 64 outputs as stored within the memory 66a of computer 66. Such noise test receiver outputs may include a noise array 100 specifying radio frequencies and associated noise temperatures as measured by noise test receiver 64. In this example, noise test receiver 64 may measure the noise temperatures at the received radio frequencies of each of radio receivers 20(1)–20(N) and provide this information to computer 66. Noise test receiver 64 may also provide an additional signal array 102 specifying the frequency and amplitude of each significant signal the noise test receiver detects as the receiver sweeps across a band (typically this band is wider than the actual band passed by filter 56 and/or received by radio receivers 20 to ensure that no signals that may cause problematic intermodulation distortion products are missed).

FIG. 3 also shows in more detail the various system data maintained by computer 66. In this example, system data 68 includes:

a receiver sensitivity parameter 104, receiver intermodulation distortion parameter 106, system channel plan 108, multi-coupler 58 gain and noise FIG. 110, filter 56 loss 112, filter 56 bandpass and roll-off characteristics 114, a tower top amplifier 52 gain (and noise) FIG. 116, and, a feedline 60 loss parameter 118.

Figure 4:
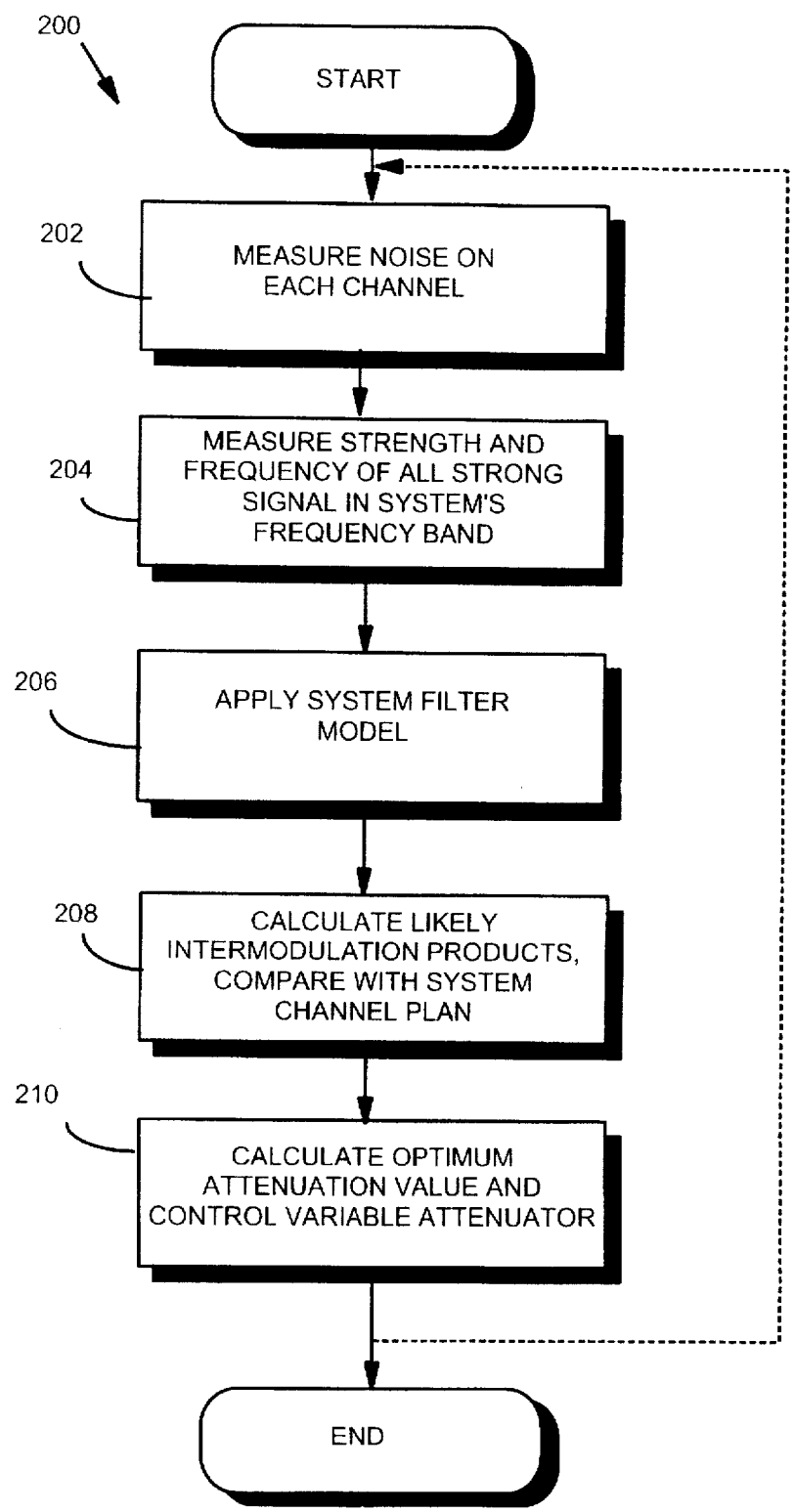
FIG. 4 shows an example process performed by the FIG. 2 system to optimize performance.

FIG. 4 shows an example process performed by noise test receiver 64 and computer 66 to optimize receive system sensitivity and maximize receiver dynamic range without degrading intermodulation performance. Noise test receiver 64 first measures the noise on each channel within the system channel plan to produce noise array 100 (block 202). The noise test receiver 64 then measures the strength and frequency of all strong signals within the system's frequency spectrum to provide signal array 102 (block 204). Noise test receiver 64 provides the noise array 100 and the signal array 102 in digital form for analysis by computer 66.

Computer 66 may first apply a digital model of the frequency characteristics of filter 56 to the signal array 102 (block 206). The result of this step is to potentially eliminate some of the measured signal components (or to lessen their amplitudes)—just as the real filter 56 will do with respect to the actual received signals before providing them to multi-coupler 58. Computer 66 then uses these results to calculate the frequencies and amplitudes of likely intermodulation distortion products (e.g., third and fifth order) the received signals may produce at receivers 20, and to compare these intermodulation distortion products with the system channel plan (block 208) to see whether they will fall within the band pass of any receiver 20. In other words, computer 66 performs a mathematical analysis to predict the significant intermodulation distortion products that may result, and then determine whether any of these likely intermodulation distortion products have a frequency and amplitude such that they will interfere significantly with reception on any of the radio frequencies received by receivers 20(1)–20(N). In this example, computer 66 uses receiver performance parameters (e.g., receiver intermodulation distortion parameter 106) to test whether (and to what extent) the calculated intermodulation distortion products will adversely affect reception.

Computer 66 may use an iterative technique to model system 50 for different attenuation settings of variable attenuator 54. Computer 66 can use this model to maximize receiver sensitivity by reducing the amount of attenuation applied by variable attenuator 54 so that the site noise level is matched to the "noise floor" of the receivers—thereby maximizing the dynamic range of the system. Since computer 66 also has full information about likely intermodulation products that may result, it can evaluate (based on the intermodulation rejection characteristics of radio receivers 20) whether any of these products will interfere with the operation of any of radio receivers 20.

Based on these measured and calculated results, computer 66 calculates an optimum attenuation value $L_{atten}$ and applies it to program variable attenuator 54 (block 210). The computer 66 can increase the amount of attenuation provided by variable attenuator 54 to reduce receiver susceptibility to intermodulation distortion, or decease attenuation to maximize receiver sensitivity and coverage area when there is less chance of harmful intermodulation distortion products. The final attenuation value $L_{atten}$ that computer 66 arrives at is typically a trade-off between receiver sensitivity and receiver intermodulation distortion performance, this value being optimized based on the specific system characteristics and the particular ambient noise and signal environment existing at the time.

In one example, noise test receiver 64 and computer 66 are connected to system 50 at time of initial system installation and test. These components 64, 66 monitor the environment of system 50 over a period of time to develop historical data, and generate a $L_{atten}$ attenuation value based on the historical data. Based on the assumption that the historical data is representative of future ambient operating conditions, the radio engineer may manually set the attenuation applied by variable attenuator 54 based on the optimal attenuation value recommended by computer 66. Noise test receiver 64 and computer 66 may then be removed from system 50 in this example.

In another example, noise test receiver 64 and computer 66 are permanently connected as part of system 50 to exercise dynamic, instantaneous control over variable attenuator 54 in response to changing conditions. In this dynamic control example, computer 66 repetitively generates optimized performance parameters dynamically (see dotted return line in FIG. 4) that are used to dynamically control the value of programmable attenuator 54 to yield maximum system performance under varying conditions. For example, the ambient noise experienced by the receiver system 50 can depend on varying factors such as the state of co-located transmitter equipment, weather conditions, etc. Computer 66 can substantially adjust to these changes, thereby providing optimal receiver dynamic range even as the site noise floor changes. As another example, if a strong but intermittent intermodulation distortion producing signal source is present within the environment of system 50, computer 66 responds by automatically increasing the attenuation provided by variable attenuator 54 whenever the signal is present (to reduce the potential for intermodulation distortion), and automatically decreasing the attenuation when the signal is not present (to maximize receive system sensitivity). Such dynamic control protects the receive system from intermodulation distortion at the cost of smaller system coverage area only when the problem signal is actually present. Because of the high gain in the radio receive system 20, an increase in the amount of attenuation provided by variable attenuator 54 typically does not translate into a loss of receiver sensitivity by the same amount (e.g., increasing attenuation by 10 dB may translate into only a 1 or 2 dB decrease in receiver sensitivity)—thus providing a large adjustment range that maximizes system coverage area while minimizing interference due to intermodulation distortion products.

An improved receiver system has been described that optimizes receiver sensitivity while taking into account the potential for intermodulation distortion. While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An arrangement for improving the performance of a radio receiver comprising:

a noise test receiver that outputs measurements concerning ambient noise and radio signals;

a computer coupled to the noise test receiver that automatically analyzes, based on the measurements, whether the ambient signals are likely to generate any intermodulation distortion products; that will adversely affect the radio receiver and a variable gain device connected to the radio receiver and controlled by the computer, the computer automatically controlling, based at least in part on the noise test receiver outputs and the analysis, the gain provided by the variable gain device to substantially maximize effective sensitivity and dynamic range of the radio receiver while protecting the radio receiver against intermodulation distortion.

2. A method of optimizing radio receiver equipment for sensitivity, intermodulation performance and coverage, the method comprising:

(a) providing data relating to the configuration of the radio receiver equipment;

(b) measuring at least one ambient noise characteristic with a noise test receiver additional to the radio receiver equipment;

(c) detecting the presence and strength of potential distortion generating signals; and (d) based at least in part on steps (a)–(c), adjusting at least one radio receiver equipment parameter to optimize radio receiver equipment sensitivity without degrading intermodulation performance.

3. A method as in claim 2 wherein the receiver equipment includes an antenna coupled to plural receivers through a tower top amplifier, a feedline, a filter and a multi-coupler, and the providing step (a) includes providing at least the following:

(i) at least one receiver sensitivity parameter, (ii) at least one receiver intermodulation rejection parameter, (iii) at least one feedline loss parameter, (iv) at least one parameter indicating the gain and noise figure of the multi-coupler, (v) at least one parameter indicating the gain and noise figure of the tower top amplifier, (vii) at least one parameter indicating filter loss, and (viii) data concerning the operating frequencies of the plural receivers.

4. A method as in claim 2 wherein adjusting step (d) includes the step of dynamically computing the optimized adjustment parameter.

5. A method as in claim 2 wherein adjusting step (d) includes the step of automatically, dynamically controlling the value of a programmable attenuator to yield maximum receive system performance characteristics under varying conditions.

6. A method as in claim 2 wherein the receiver equipment includes a filter, the method further includes the step of computing the characteristics of the filter, and adjusting step (d) includes the step of applying said computed filter characteristics to at least the signals detected by step (c).

7. A method of improving the sensitivity of radio receiver equipment, including a noise test receiver and at least one other receiver, without substantially degrading the equipment's intermodulation performance, the equipment having at least one component providing an adjustable transfer function, the method comprising:

(a) automatically measuring at least one ambient radio signal condition, received with the noise test receiver;

(b) automatically predicting, based at least in part on the ambient radio signal condition measured by step (a), whether ambient signals are likely to generate any problematic intermodulation distortion products; and (c) based at least in part on the prediction made by step (b), adjusting the transfer function of the component to substantially maximize receive sensitivity while protecting against intermodulation distortion.

8. A method as in claim 7 wherein the measuring step (a) includes the step of measuring ambient radio frequency noise.

9. A method as in claim 7 wherein the measuring step (a) includes the step of performing spectral analysis across a radio frequency band.

10. A method as in claim 7 wherein step (b) includes the step of calculating, based on the measured ambient radio signal condition, the amplitude and frequency of at least some third or higher order intermodulation distortion products.

11. A method as in claim 7 wherein step (b) includes the step of applying a filter model to at least some of the measurement results of step (a).

12. A method as in claim 7 wherein the component comprises a variable attenuator providing the transfer function, and step (c) includes the step of adjusting the attenuation of the variable attenuator.

13. A method as in claim 7 wherein step (a) is repeated, and step (b) dynamically determines the existence of problematic intermodulation distortion products based on changing ambient signal conditions.

14. A method as in claim 7 wherein step (c) includes the step of dynamically continually adjusting the adjustment parameter during operation of the radio receiver equipment to yield maximum system performance under varying conditions.

15. A method as in claim 7 wherein step (c) includes the steps of:

(i) storing at least one characteristic of the radio receiver equipment, and (ii) taking the stored characteristic into account in adjusting the transfer function.

16. A method as in claim 7 wherein the radio receiver equipment is of the type including an antenna coupled a tower top amplifier, a feedline, a multi-coupler and a filter, and the step (c) includes the step of taking into account at least one of the following:

(i) receiver equipment sensitivity, (ii) receiver equipment intermodulation rejection, (iii) feedline losses, (iv) gain and noise figure of the multi-coupler, (v) gain and noise figure of the tower top amplifier, and (vii) filter loss.

17. A method as in claim 7 wherein the radio receiver equipment is of the type including an antenna coupled a tower top amplifier, a feedline, a multi-coupler and a filter, and step (c) includes the step of taking into account all of the following:

(i) receiver equipment sensitivity, (ii) receiver equipment intermodulation rejection, (iii) feedline losses, (iv) gain and noise figure of the multi-coupler, (v) gain and noise figure of the tower top amplifier, and (vii) filter loss.

18. A system for improving the sensitivity of a radio receiving system of the type having plural radio receivers without substantially degrading the system's intermodulation performance, the system including an adjustable attenuator, the system further comprising:

ambient radio signal condition measuring means additional to the plural radio receivers for automatically measuring at least one ambient radio signal;

analyzing means, coupled to the ambient radio signal condition measuring means, for automatically analyzing the measured ambient radio signal to determine possible troublesome interference; and adjusting means, coupled to the analyzing means and to the plural radio receivers, for adjusting the attenuation of the variable attenuator to substantially maximize receive sensitivity while protecting against interference.

19. A system as in claim 18 wherein the analyzing means includes means for calculating potential intermodulation distortion products.

20. A system as in claim 18 wherein the measuring means includes a spectrum analyzer.

* * * * *